US009252686B2

(12) United States Patent
Nitto (10) Patent No.: US 9,252,686 B2
(45) Date of Patent: Feb. 2, 2016

(54) DRIVE CONTROL APPARATUS AND DRIVE CONTROL METHOD FOR VIBRATION WAVE DRIVING APPARATUS (75) Inventor: Kiyoshi Nitto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 13/575,003

(22) PCT Filed: Jan. 25, 2011

(86) PCT No.: PCT/JP2011/000385
§ 371 (c)(1),
(2), (4) Date: Jul. 24, 2012

(87) PCT Pub. No.: WO2011/093060
PCT Pub. Date: Aug. 4, 2011

(65) Prior Publication Data
US 2012/0286704 A1 Nov. 15, 2012

(30) Foreign Application Priority Data

Jan. 28, 2010 (JP) ................................. 2010-016678

(51) Int. Cl.
*H02K 33/00* (2006.01)
*H02N 2/14* (2006.01)
(52) U.S. Cl.
CPC ..................................... *H02N 2/142* (2013.01)
(58) Field of Classification Search
CPC ........ H02P 25/027; H02N 2/14; F04B 35/045
USPC ............. 318/114, 119; 310/311, 316.01, 317, 310/318
See application file for complete search history.

(56) References Cited

U.S. PATENT DOCUMENTS

| 4,560,263 | A | 12/1985 | Katsuma |
| 5,173,631 | A * | 12/1992 | Suganuma ............... 310/316.02 |
| 6,288,475 | B1 * | 9/2001 | Ito et al. .................... 310/323.01 |
| 7,187,102 | B2 * | 3/2007 | Varadi et al. ............. 310/316.01 |
| 7,423,361 | B2 * | 9/2008 | Tanaka ...................... 310/316.01 |
| 7,834,515 | B2 * | 11/2010 | Tanimura ...................... 310/317 |
| 2009/0085433 | A1 | 4/2009 | Yoshimura |

FOREIGN PATENT DOCUMENTS

| CN | 101401291 A | 4/2009 |
| JP | 59-106886 A | 6/1984 |
| JP | H03-145976 A | 6/1991 |
| JP | 5-176562 A | 7/1993 |
| JP | 5-336762 A | 12/1993 |
| JP | H06-014565 A | 1/1994 |
| JP | H07-123752 A | 5/1995 |

(Continued)

*Primary Examiner* — Rina Duda
(74) *Attorney, Agent, or Firm* — Canon U.S.A., Inc. IP Division (57) ABSTRACT Provided are a drive control apparatus and a drive control method for a vibration wave driving apparatus enabling a wider dynamic range and increased quietness. The drive control apparatus for a vibration wave driving apparatus of the present invention is a drive control apparatus for a vibration wave driving apparatus in which, by providing a drive signal to a vibrator provided with an electro-mechanical energy conversion device, a driven part in contact with the vibrator is relatively moved, wherein, when the driven part is activated by changing a frequency of the drive signal, a time throughout which the drive signal is made to be in an off state is provided every time the frequency is changed.

16 Claims, 6 Drawing Sheets (56) References Cited

FOREIGN PATENT DOCUMENTS

| JP | H09-191667 A | 7/1997 |
|----|---|---|
| JP | 11-215858 A | 8/1999 |
| JP | 2001-037273 A | 2/2001 |
| JP | 2002-142475 A | 5/2002 |
| JP | 2009-055744 A | 3/2009 |
| JP | 2009-89517 A | 4/2009 |
| JP | 2009-106152 A | 5/2009 |

* cited by examiner

DRIVE CONTROL APPARATUS AND DRIVE CONTROL METHOD FOR VIBRATION WAVE DRIVING APPARATUS

TECHNICAL FIELD

The present invention relates to drive control apparatuses and drive control methods for controlling driving of vibration wave driving apparatuses.

BACKGROUND ART

In a publicly known vibration wave driving apparatus (a so called ultrasonic wave motor), utilizing a piezoelectric device, included in optical apparatuses, such as cameras, a driven part called a rotor is strongly pressed against a vibrator called a stator.

Hence, to activate this driven part in a resting state, a force applied to the driven part needs to be stronger than the sum of the static friction force between the vibrator and the driven part and the static inertial force of the driven part.

Accordingly, at the time of activation, control is performed such that a voltage higher than the alternating voltage applied to the piezoelectric device in a steady state driving is applied to the device.

However, since there is a case in which even the above control does not improve activation performance, PTL 1 proposes a driving method for a vibration wave driving apparatus, in which activation is performed after lowering the fixing strength between the vibrator and the driven part by causing the vibrator to generate standing wave vibration at the time of activation.

In addition, PTL 2 proposes a driving method for a vibration wave driving apparatus in which white noise is applied as an excitation signal at the time of activation.

CITATION LIST

Patent Literature

PTL 1: Japanese Patent Laid-Open No. 59-106886
PTL 2: Japanese Patent Laid-Open No. 5-176562

SUMMARY OF INVENTION

A general method used to activate a vibration wave driving apparatus is to obtain a desired number of revolutions by applying a voltage having a predetermined sweep frequency and then sweeping down from the predetermined frequency.

There is hysteresis between the frequency-revolution curve in the case of obtaining a desired number of revolutions by sweeping down from a certain predetermined sweep frequency and the frequency-revolution curve obtained in the case of sweeping up from a certain predetermined desired number of revolutions.

This hysteresis causes the following problems.

That is, in a vibration wave driving apparatus, the contact state between the stator and rotor is unstable in a low-speed range, causing an increase in the minimum number of activation revolutions. This results in rapid acceleration at the time of activation, causing a large impact sound to be generated.

In the case of a camera mainly used for recording a movie, in particular, this sound at the activation time is recorded as a sound in the movie, causing a problem in that the quality of the movie is lowered.

Although the two existing drive control techniques described above try to improve the activation performance, such existing techniques do not necessarily provide sufficiently satisfactory solutions for realizing a wider dynamic range and increased quietness.

In view of the above-described problems, the present invention provides a drive control apparatus and a drive control method for a vibration wave driving apparatus allowing a wider dynamic range and increased quietness to be realized.

The present invention provides a drive control apparatus and a drive control method for a vibration wave driving apparatus, in which, by providing a drive signal to a vibrator provided with an electro-mechanical energy conversion device, a driven part in contact with the vibrator is relatively moved, wherein, when the driven part is activated by changing a frequency of the drive signal, a time throughout which the drive signal is made to be in an off state is provided every time the frequency is changed.

According to the present invention, a drive control apparatus and a drive control method for a vibration wave driving apparatus enabling a wider dynamic range and increased quietness is realized.

DESCRIPTION OF EMBODIMENT

An embodiment of the present invention is described below.

As an embodiment of the present invention, description is made of an exemplary configuration of a vibration wave driving apparatus and a drive control apparatus for controlling driving of the apparatus, in which a driven part in contact with the driving portion of a vibrator is relatively moved by generating elliptical motion in the driving portion of the vibrator.

Figure 1:
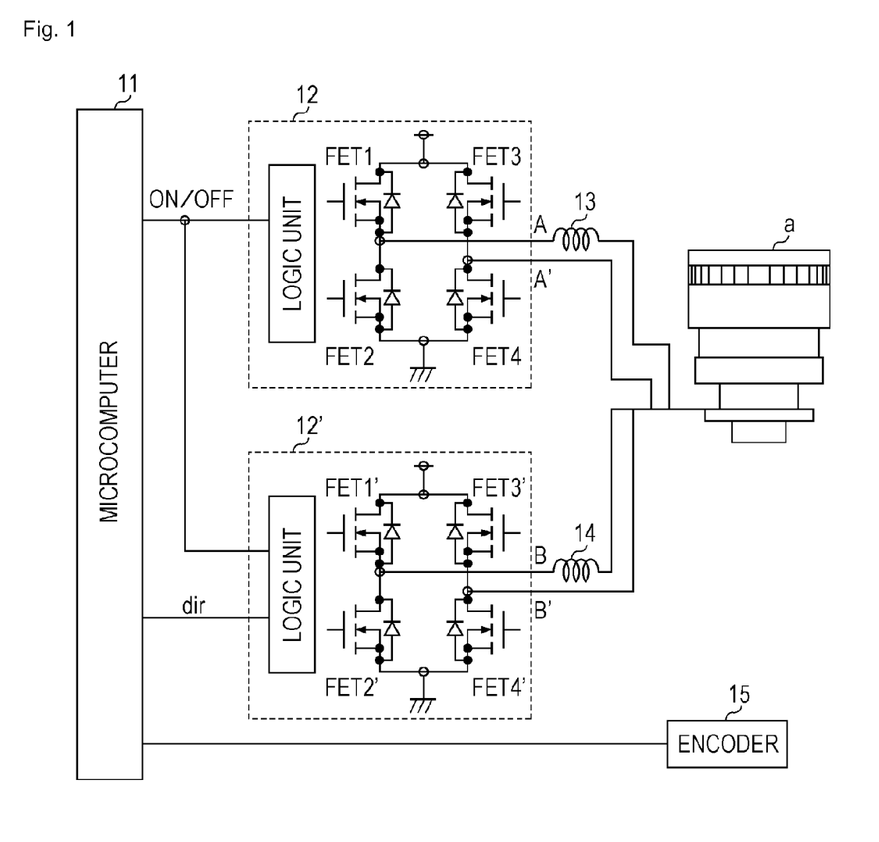
FIG. 1 is a block diagram of a drive control apparatus in a vibration wave driving apparatus applicable to the present invention.

FIG. 1 is a block diagram of a drive control circuit functioning as the drive control apparatus of the present embodiment. In FIG. 1, reference sign a denotes a vibration motor which is a vibration wave driving apparatus.

First an exemplary configuration of the vibration motor a in FIG. 1 is described with reference to FIG. 4.

Figure 4:
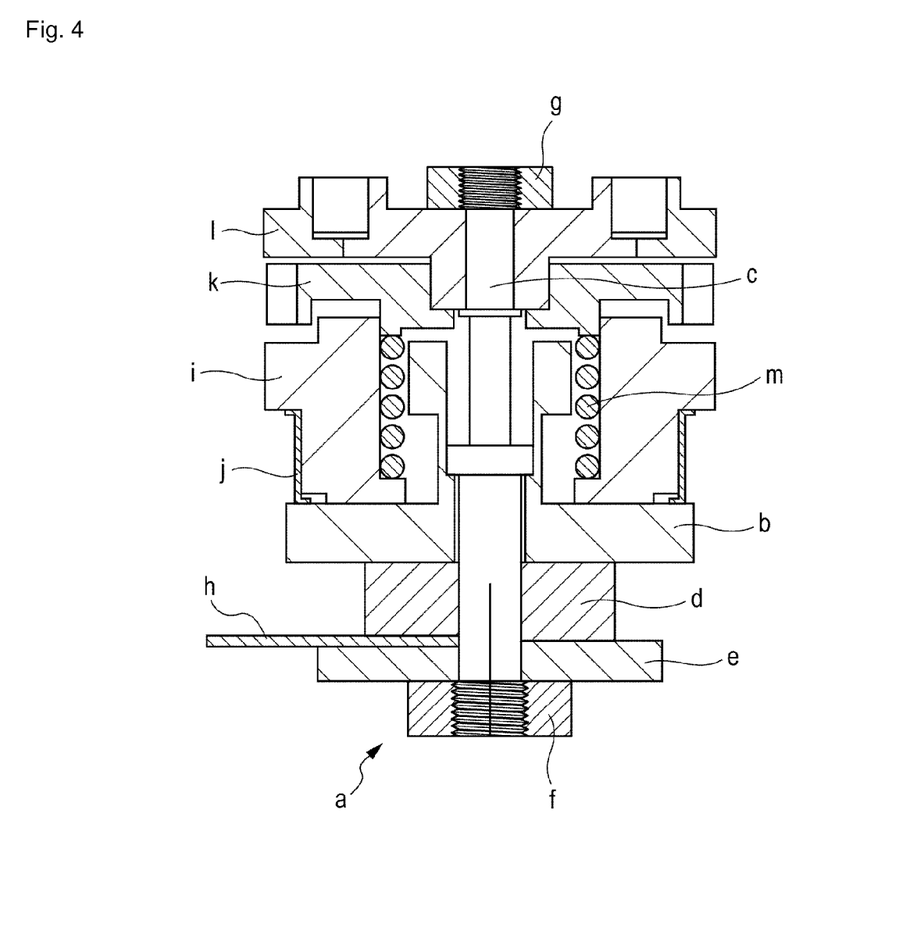
FIG. 4 illustrates a configuration of a vibration wave driving apparatus applicable to the present invention.

In FIG. 4, reference sign b denotes a first elastic body formed of a material with a low vibration attenuation loss, such as a metal, and reference sign d denotes a piezoelectric device which is an electro-mechanical energy conversion device.

Further, reference sign h denotes a flexible substrate for applying a drive signal from the drive control circuit illustrated in FIG. 1 to the piezoelectric device d, reference sign e denotes a second elastic body, and reference sign f denotes a first fastening member to be fit onto a screw portion formed at the lower end of a shaft c.

The shaft c is inserted into a through hole provided through the centers of the first elastic body b, the piezoelectric device d, the flexible substrate h, and the second elastic body e.

A step is provided at a point along the shaft c, and this step contacts a step provided on the inner surface of the first elastic body b.

A tip (lower end) of the shaft c has a screw portion formed thereon, and by fitting and fastening the first fastening member f to this screw portion, the second elastic body e, the flexible substrate h, the piezoelectric device d, and the first elastic body b can be fixed.

A contact spring j fixed to a rotor i which is a driven part is in pressure contact with the surface (driving portion) of the first elastic body b on the side not in contact with the piezoelectric device d. The contact spring j, which has elasticity, is fixed to the rotor i and rotates together with the rotor i.

A gear k which is an output unit is fit onto the rotor i in such a manner as to allow the rotor i to move in the rotation axis direction and follow the movement of the rotational motion of the rotor i.

Reference sign m denotes a pressure unit, such as a spring, which is arranged between the spring support of the rotor i and the gear k, presses the rotor i down toward the first elastic body b.

The gear k is pivotally supported by a fixed member 1 coupled to the shaft c, and its position in the axis direction is controlled by the fixed member 1. The shaft c also has a screw portion formed at the tip (upper end), on the side not fit into the first fastening member f, and a second fastening member g is made to fit onto this screw portion, thereby fixing the shaft c to the fixed member 1.

The fixed member 1 is provided with screw holes, and by fixing the fixed member 1 to a desired location using screws, the vibration wave driving apparatus can be fixed to the desired location.

The piezoelectric device d is formed of a plurality of stacked piezoelectric layers. For example, electrode layers are formed on both surfaces of a piezoelectric substrate, and the electrode layers are divided into four regions (four electrodes).

The four regions of the piezoelectric substrate corresponding to the four electrodes are poled in the same direction in the thickness direction of the piezoelectric device d. When drive signals (A, A', B, and B' described later) are respectively applied to these four electrode layers, two bending vibrations (with a spatial phase difference of 90 degrees therebetween) which swing the first elastic body b in the front-back and left-right directions in the plane of the figure are generated in the vibrator.

When these vibrations are combined, elliptical motion is excited on the surface of the first elastic body b.

When the contact spring j is made to be in pressure contact with the surface of the first elastic body b in which the elliptical motion has been excited, the contact spring j and the rotor i (driven part) move in such a manner as to be pushed out due to this elliptical motion.

The configuration of the vibration motor is not limited to the above-described configuration.

For example, the present invention can also be applied to an annular vibration wave driving apparatus which is formed of an electro-mechanical energy conversion device such as a piezoelectric device, a vibrator, and a driven part, and for which a progressive vibration wave is generated in the vibrator by applying an AC voltage with two or more phases to the electro-mechanical energy conversion device.

Referring back to FIG. 1, in the present embodiment, switching circuits 12 and 12' use field effect transistors (FETs) having low on-resistance for switching devices. Each FET is provided with a diode for passing a reverse current therethrough. This diode is provided to prevent damage to the FET due to a reverse current. The phases of drive signals A and A' are respectively different from those of drive signals B and B' by 90 degrees with respect to time.

Reference signs 13 and 14 denote impedance elements for performing impedance matching with the motor. In the present embodiment, the impedance elements 13 and 14 are inductance elements.

In the four-phase driving method illustrated in FIG. 1, the motor can be driven with a lower voltage and higher efficiency by adding impedance elements at the positions 13 and 14.

Reference sign 15 denotes an encoder (moving amount detector) that detects the relative position of the driven part with respect to the vibrator.

Note that a signal dir input from a microcomputer (controller) 11 to the switching circuit 12' is a signal instructing forward or reverse rotation. When a forward rotation signal is input to the switching circuit 12' from the microcomputer 11, the switching circuit 12' is controlled such that the signals B and B' are respectively 90 degrees behind the signals A and A' of the switching circuit 12, in terms of time phase.

On the other hand, when a reverse rotation signal is input to the switching circuit 12', the outputs B and B' are controlled to be respectively 90 degrees ahead the switching pulses A and A' in terms of a time phase.

Here, the signals A and A' and the signals B and B' provide drive voltages (AC voltages) functioning as drive signals, and FIG. 1 illustrates how floating driving is performed by these drive voltages. In the floating driving, a state in which the signal A has a positive voltage and the signal A' has the ground voltage and a state in which the signal A has the ground voltage and the signal A' has a positive voltage are alternately repeated. Similarly, with regard to the signal B and B' which are respectively 90 degrees behind the signals A and A', a state in which the signal B has a positive voltage and the signal B' has the ground voltage and a state in which the signal B has the ground voltage and the signal B' has a positive voltage are alternately repeated.

Compared with the case in which the signal A is always made to have a positive voltage and the signal A' is always made to have the ground voltage, this floating driving allows apparently twice the voltage to be applied, thereby generating twice the amplitude. In other words, compared with the existing method, the same amplitude is generated with half the voltage. In addition, although description has been made of the case in which the time phases of the signals A and A' are different from those of the signals B and B' by 90 degrees, the time phase differences are not limited to 90 degrees.

Description will now be made of the configuration, in the present embodiment, in which the drive signals, which are pulse signals, are made to be off and then on (off-on) whenever a predetermined sweep frequency is changed.

Figure 2:
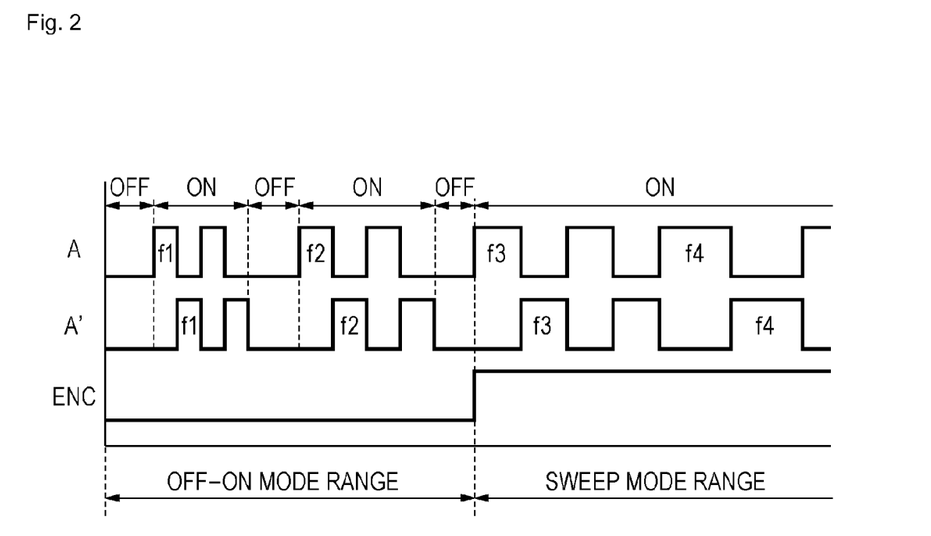
FIG. 2 is an illustration of off-on timing waveforms of a switching circuit applicable to the present invention.

FIG. 2 is an illustration of off-on timing waveforms of the switching circuits 12 and 12', and illustrates how the signals A and A' and an encoder signal (signal ENC) output from the encoder (moving amount detector) change at the time when the motor is driven.

First a drive signal having a frequency f1 is input as the drive signal. After the signal having the frequency f1 has been input for a predetermined period of time, the drive signal is made to enter an off state.

Then, after the off time has lasted for a predetermined period of time, the drive signal having a frequency f2 is input. The period of the off time of the drive signal may be appropriately set.

At this time, the relation between the frequencies f1 and f2 is f1>f2. After the signal having the frequency f2 has been input, the drive signal is made to enter an off state.

The range from the start up to this point is denoted by an off-on mode in the figure to make the range readily understandable.

Here, this off-on operation is performed by making both signals A and A' (signals B and B') be off and then on at the same time in accordance with an instruction from the microcomputer 11 illustrated in FIG. 1.

Further, a signal having a frequency f3 is input as the next drive signal. At this time the relation between the frequencies f2 and f3 is f2>f3.

When examining the signal ENC, it can be seen that there is an input to the encoder after the signal having the frequency f3 has been input.

In other words, the signal ENC shows that the motor has entered a driven state. When it is determined that the motor has been driven, a signal having a frequency f4 continues to be input.

At this time, the relation between the frequencies f3 and f4 is f3>f4. After this, the frequency continues to be lowered until a predetermined number of revolutions is obtained. The range from the activation to this point is called a sweep mode.

In the configuration of the present embodiment, when the drive signal is input such that the predetermined sweep frequency is changed so as to be lowered step by step, the drive signal is made to be off and then on every time the predetermined frequency is changed (that is, a period of time during which the drive signal is made to be off is provided every time the frequency is changed).

In the configuration of the present embodiment, the moving amount of the driven part is detected by the encoder, and on the basis of the detected moving amount, the microcomputer 11 can perform switching between the mode in which the pulsed drive signal is made to be off-on and the mode in which the frequency of the drive signal is swept (the frequency is continuously changed without making the drive signal be off).

Figure 3:
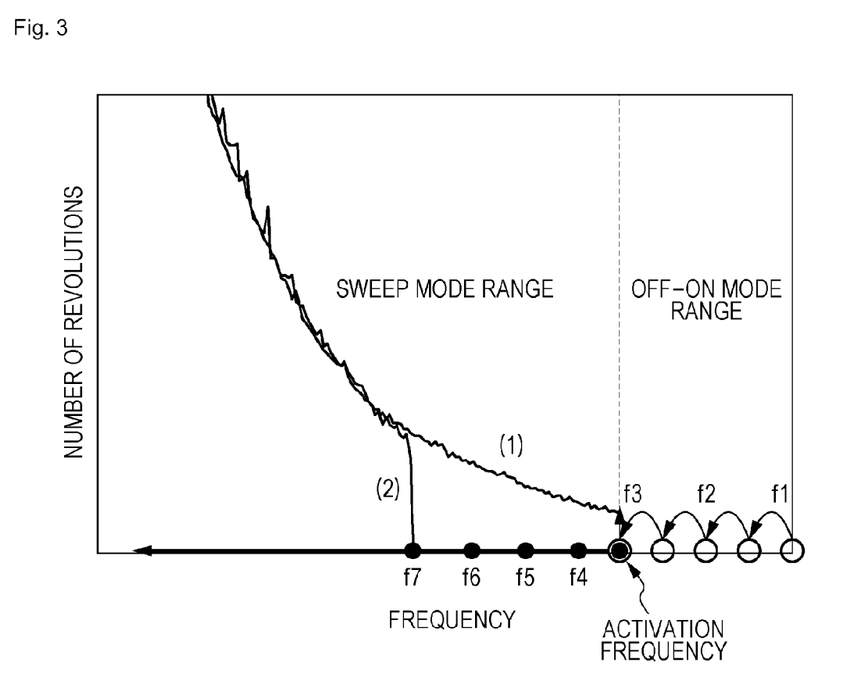
FIG. 3 is a schematic diagram illustrating frequency-revolution characteristics applicable to the present invention.

FIG. 3 is a schematic diagram illustrating the frequency-revolution characteristics, showing the changes in the signal illustrated in FIG. 2 and the number of revolutions of the motor.

The figure shows how the motor is activated and starts to rotate at an activation frequency point denoted by the arrow after the off-on state of the input signal has been repeated every time the predetermined frequency has been changed.

The line showing the frequency-revolution characteristics at this time is denoted by reference sign (1).

Further, it has been confirmed by the experiment performed by the inventor and others that the line denoted by (1) is approximately the same as the frequency-revolution characteristics obtained by sweeping up from a desired number of revolutions.

Figure 5:
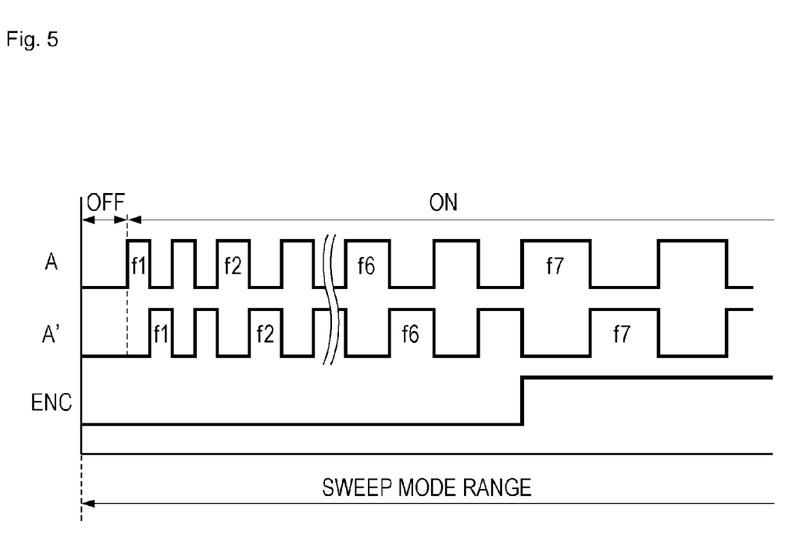
FIG. 5 is an illustration of off-on timing waveforms of a switching circuit in an existing example.

FIG. 5 illustrates how the input signals A and A' formed of only a sweep mode range and the signal ENC change in the existing example.

First an input signal having a frequency f1 is input as the drive signal. After the signal having the frequency f1 has been input for a predetermined period of time, a signal having a frequency f2 is continuously input as the next signal.

At this time, the relation between the frequencies f1 and f2 is f1>f2.

Further, signals having frequencies f3, f4, . . . , and f7 are continuously input. The relations among the frequencies f2, f3, . . . , and f7 are f2>f3> . . . , >f7.

The encoder signal ENC shows that there is an input to the encoder after the signal having the frequency f7 has been input. In other words, the signal ENC shows that the motor has entered a driven state.

Note that in the above description, a signal having a predetermined frequency is applied as the drive signal. However, the drive signal may be superimposed with other frequency components that are effective for weakening the fixing strength between the vibrator and the driven part.

Figure 6:
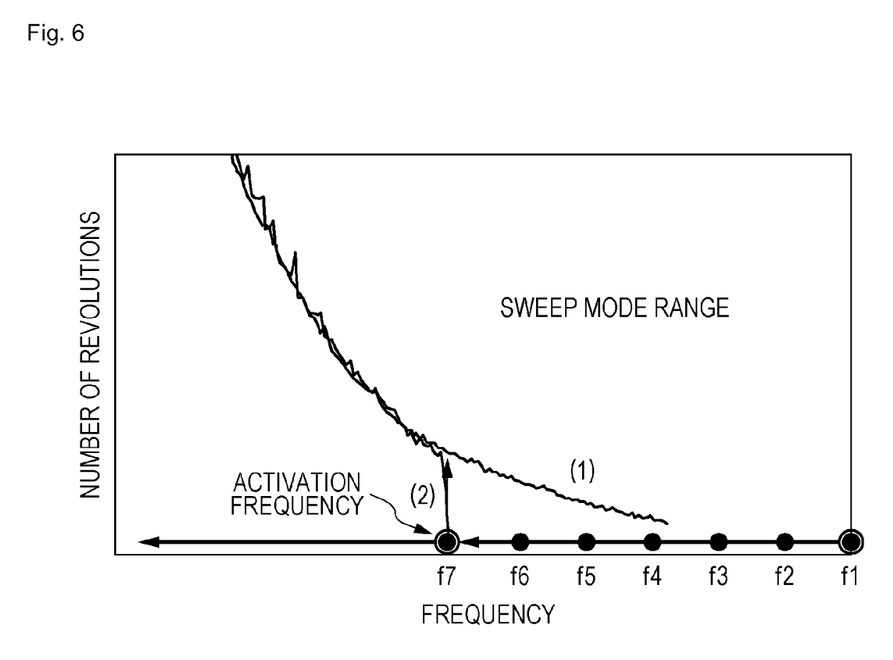
FIG. 6 is a schematic diagram illustrating the frequency-revolution characteristics for the cases to which the present invention and the existing example are applied.

FIG. 6 is a schematic diagram illustrating the frequency-revolution characteristics for the existing example and the case to which the present invention has been applied, showing the changes in the signal illustrated in FIG. 5 and the number of revolutions of the motor.

The figure shows how the motor is activated and starts to rotate at an activation frequency point denoted by the arrow when the predetermined frequency is changed and swept down in the state in which the input signal is always on.

The line (existing example) showing the frequency-revolution characteristics at this time is denoted by reference sign (2).

When the line denoted by (1) (the case to which the present invention has been applied) is compared with the line denoted by (2), it is clear that in the case of the line denoted by (1), the minimum number of revolutions is lower and stable driving starting from a lower frequency is possible.

As described above, according to the present embodiment, stable driving starting from a lower frequency is possible compared with the existing example.

This is considered to be based on the fact that the stepwise input of the present embodiment in which on and off are repeated for every frequency allows drive wave components to be increased and the activation performance to be improved compared with the continuous input without an off state in the existing example. Hence, the hysteresis of the frequency-revolution curve described before is reduced.

This allows the minimum number of activation revolutions to be decreased and gradual acceleration at the activation time to be realized.

As a result, an impact sound at the activation time is reduced, and a wider dynamic range and increased quietness of a vibration wave driving apparatus are realized.

In addition, since increased voltages, for example, and use of high voltage devices are not required in the configuration, a vibration wave driving apparatus with high control capability is realized without an increase in the cost of the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-016678, filed Jan. 28, 2010, which is hereby incorporated by reference herein in its entirety.

REFERENCE SIGNS LIST a Vibrator
11 Microcomputer
12 Switching circuit 13, 14 Inductance elements
15 Encoder

The invention claimed is:

1. A drive control method for a vibrator, comprising activating the vibrator, the vibrator comprising an electro-mechanical energy conversion device, wherein a driven part is in contact with the vibrator, and a relative position of the driven part and the vibrator is changed by providing a drive signal to the vibrator, the method comprising:
applying as a drive signal a first drive signal having a first frequency to the vibrator;
after applying the first drive signal, applying as the drive signal a second drive signal having a second frequency to the vibrator; and
providing a time period throughout which the drive signal is made to be in an off state between the application of the first drive signal and the application of the second drive signal,
wherein the relative position of the driven part and the vibrator remains at a first relative position during the application of the first drive signal and the time period throughout which the drive signal is made to be in the off state, and
wherein the vibrator enters into a drive state, and the relative position of the driven part and the vibrator changes to a second relative position, after applying the second drive signal.

2. The drive control method according to claim 1,
wherein the drive signal includes a plurality of drive signals having different time phases, and
wherein the plurality of the drive signals are made to be in an off state at the same time every time the frequency is changed.

3. The drive control method according to claim 1, wherein the second frequency is lower than the first frequency, and the time period throughout which the drive signal is made to be in the off state is provided before the frequency is lowered.

4. The drive control method according to claim 1, wherein the drive control apparatus is configured to be capable of switching between a first mode in which an off state and an on state of the drive signal are repeated every time the frequency is changed and a second mode in which the frequency is continuously changed without making the drive signal be in an off state, and switching to the second mode occurs in accordance with a detected value obtained by a moving amount detector that detects change of the relative position of the vibrator and the driven part which is in contact with the vibrator.

5. The drive control method according to claim 1, wherein when the vibrator is in the non-vibration state, a moving amount detector does not detect change of the relative position of the vibrator and the driven part which is in contact with the vibrator.

6. The drive control method according to claim 1, further comprising:
before application of the first drive signal, applying an initial drive signal having an initial frequency which is different from the first and second frequencies to the vibrator; and
providing another time throughout which a drive signal is made to be in an off state between the application of the initial drive signal and the application of the first drive signal,
wherein the vibrator is in the non-drive state from the application of the initial drive signal to the application of the second drive signal.

7. A drive control apparatus for a vibrator comprising an electro-mechanical energy conversion device, wherein a driven part is in contact with the vibrator, and a relative position of the driven part and the vibrator is changed by providing a drive signal to the vibrator, the drive control apparatus, comprising:
a controller configured to output an instruction to change a state of a drive signal such that a first drive signal having a first frequency is output to the vibrator in a first period, a second drive signal having a second frequency which is different from the first frequency is output to the vibrator in a second period, the second period occurring after the first period, and the drive signal is in off-state in a period between the first period and the second period,
wherein the relative position of the driven part and the vibrator remains at a first relative position during the first period and the period between the first period and the second period, and
wherein the vibrator enters into a drive state, and the relative position of the driven part and the vibrator changes to a second relative position, after the period between the first period and the second period.

8. The drive control apparatus according to claim 7, wherein the second frequency is lower than the first frequency.

9. The drive control apparatus according to claim 7, further comprising a moving amount detector configured to detect the change of the relative position.

10. The drive control apparatus according to claim 7, wherein the controller is configured to be capable of making the drive signal be in an off-state every time the frequency of the drive signal is changed.

11. The drive control apparatus according to claim 7,
wherein the first drive signal includes a plurality of first drive signals having different time phases, and
wherein the drive control apparatus is configured to be capable of making the plurality of the first drive signals be in an off state at the same time every time the frequency is changed.

12. The drive control apparatus according to claim 7,
wherein the controller is configured to be capable of switching between a first mode in which an off state and an on state of the drive signal are repeated every time the frequency is changed and a second mode in which the frequency is continuously changed without making the drive signal be in an off state, and switching to the second mode occurs in accordance with a detected value obtained by a moving amount detector that detects change of the relative position of the vibrator and the driven part which is in contact with the vibrator.

13. The drive control apparatus according to claim 7, wherein when the vibrator is in the non-vibration state, a moving amount detector does not detect change of the relative position of the vibrator and the driven part which is in contact with the vibrator.

14. The drive control apparatus according to claim 7, wherein the controller is configured to input an instruction to change a state of the drive signal such that a third drive signal having a third frequency is output to the vibrator after the second drive signal in output to the vibrator without a time period in which the drive signal is in off-state.

15. The drive control apparatus according to claim 7, wherein the third frequency is smaller than the second frequency.

16. The drive control apparatus according to claim 7, wherein the controller is configured to output an instruction to change the state of the drive signal such that an initial drive signal having an initial frequency which is different from the first and second frequencies is output to the vibrator in an initial period and the drive signal is in off-state in another period between the initial period and the first period,
   wherein the first period is between the initial period and the second period,
   wherein the another period is between the initial period and the first period, and
   wherein the vibrator is in the non-drive state during the initial period, the another period, the first period, and the period between the first period and the second period.

\* \* \* \* \*